Jan. 19, 1954          W. H. DRAIN          2,666,460
ACCESSORY FOR POWER TRANSPORTATION OF CHAIN SAWS
Filed Jan. 7, 1953          3 Sheets-Sheet 1
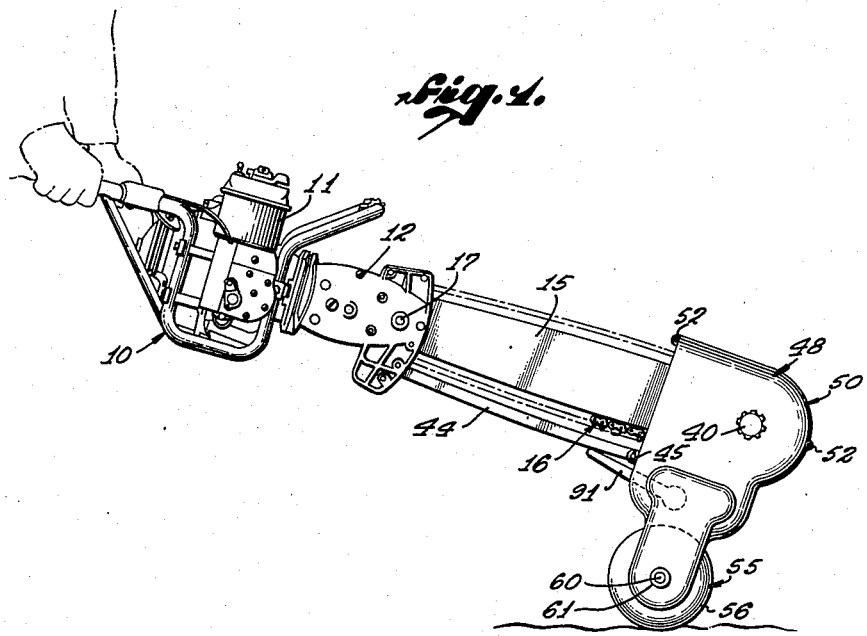
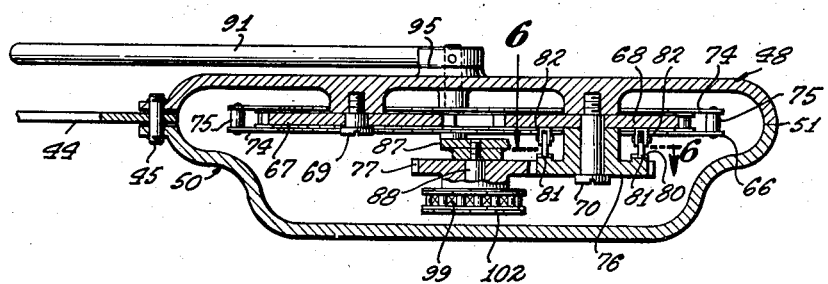
WALTER H. DRAIN,
*INVENTOR.*
BY
*ATTORNEY.*

Jan. 19, 1954 W. H. DRAIN 2,666,460
ACCESSORY FOR POWER TRANSPORTATION OF CHAIN SAWS
Filed Jan. 7, 1953 3 Sheets-Sheet 2

WALTER H. DRAIN,
INVENTOR.

BY

ATTORNEY.

Jan. 19, 1954     W. H. DRAIN     2,666,460
ACCESSORY FOR POWER TRANSPORTATION OF CHAIN SAWS
Filed Jan. 7, 1953     3 Sheets-Sheet 3
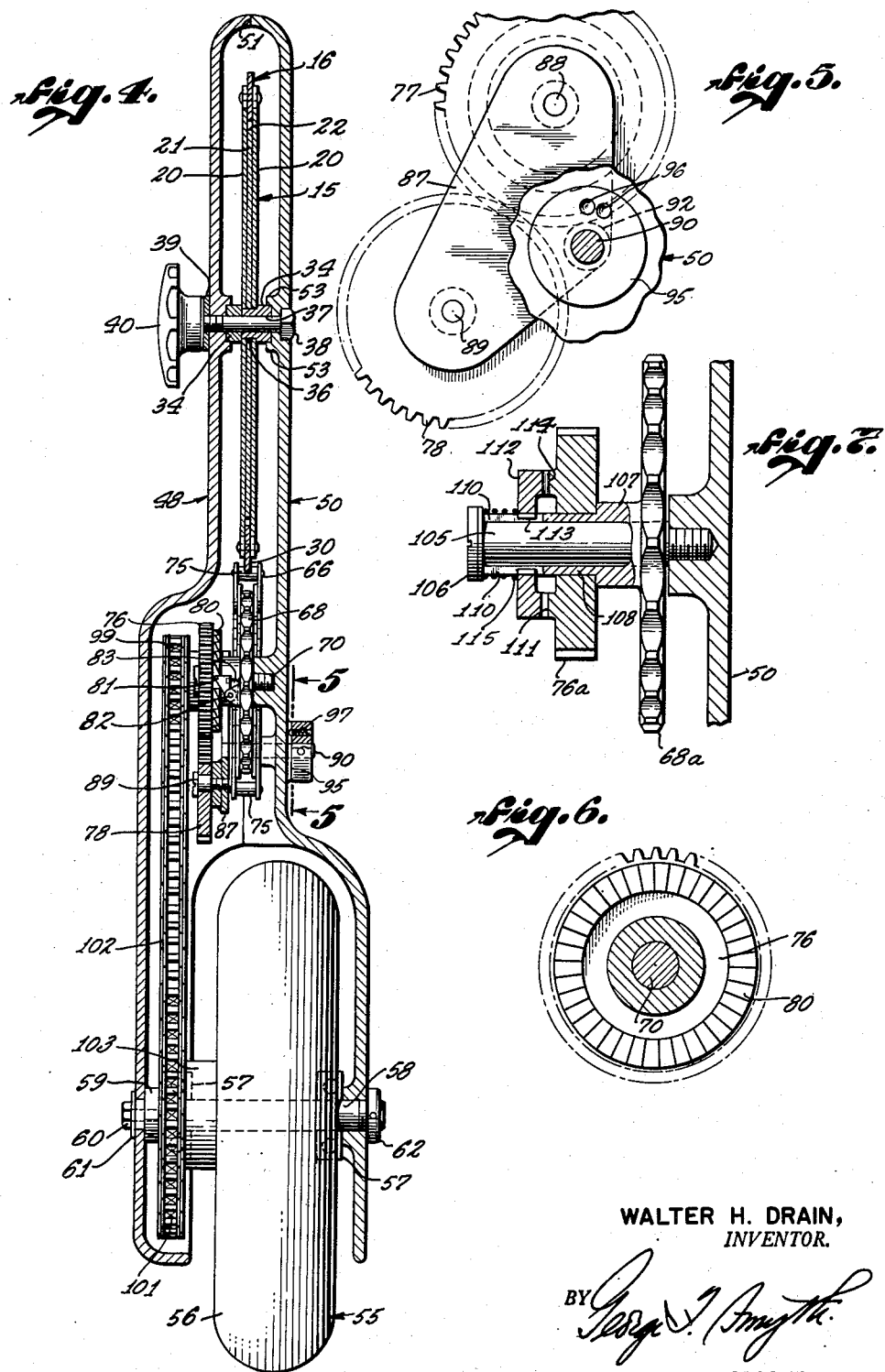
WALTER H. DRAIN,
INVENTOR.
BY
ATTORNEY.

Patented Jan. 19, 1954

2,666,460

UNITED STATES PATENT OFFICE 2,666,460

ACCESSORY FOR POWER TRANSPORTATION OF CHAIN SAWS

Walter H. Drain, Hermosa Beach, Calif.

Application January 7, 1953, Serial No. 329,960

15 Claims. (Cl. 143—32)

This invention relates to manually portable power-actuated chain saws with special reference to timber saws for use in lumbering operations, and is directed to accessory means for making such a saw self-propelling.

While a chain saw of this type is manually portable, nevertheless it has substantial weight and soon becomes burdensome when carried from location to location in the course of lumbering operations. Since the lumberman is also burdened with other articles, he commonly expends so much effort in transporting his equipment that the consequent fatigue seriously reduces his production efficiency.

There is a need, therefore, for means to support such a chain saw, at least partially, for the purpose of transportation, and further a need to make the chain saw self-propelling. The problem, however, is to provide for this purpose additional structure that is simple enough and light enough to be practical and, of course, that will not interfere with normal operation of the saw. A feature of the invention in this respect is the provision of a self-propelling transportation accessory that does not require a special power plant. This feature is made possible by deriving transportation power from the cutting chain of the saw itself, thus giving new functions to the cutting chain and the chain-actuating power plant.

Broadly described, the accessory provided by the invention comprises means to support the saw on at least one ground wheel to make the saw mobile and means for engagement with the cutting chain of the saw to derive power therefrom for actuating the ground wheel. The preferred embodiment of the invention comprises an accessory support unit having a single ground wheel, which unit is quickly attachable and detachable. The single ground wheel makes the saw highly maneuverable over the terrain and the accessory unit is simply removed at a new location to permit full use of the saw in the normal manner.

Any suitable means may be used to derive power from the cutting chain and any suitable means may be used to transmit the derived power to the ground wheel. In the preferred practice of the invention, power is derived from the cutting chain by sprocket means in engagement therewith. The sprocket means is preferably in the form of a suitable sprocket chain on a pair of sprocket wheels so that power may be transmitted to the sprocket wheels simply by positioning the sprocket chain for operative engagement with the cutting chain of the saw.

In the preferred embodiment of the invention, the single ground wheel supports the outer end of the saw so that the operator, by gripping the usual handle means on the chain saw, may maneuver the saw in the same manner as a wheelbarrow. A further feature of the invention is reversibility with respect to the power rotation of the ground wheel so that the operator, gripping the usual handle means, may walk with the mobile saw in either leading position or in trailing position. A still further feature is the optional inclusion of free-wheeling means to permit rotation of the ground wheel independently of the cutting chain. With this independence, it is possible to move the saw easily without applied power whenever it is desirable or necessary to do so.

A special feature of the presently preferred embodiment of the invention is that the accessory unit is interchangeable with the usual outboard handle assembly of the saw. By virtue of this interchangeability, no modification whatsoever of the chain saw is necessary to adapt it for use with the accessory unit.

The various features and advantages of the invention may be understood by reference to the following detailed description of a typical embodiment of the invention and by further consideration of the accompanying drawings.

In the drawings which are to be regarded as merely illustrative:

Figure 1 is a side elevation of a well known type of chain saw equipped with an accessory constructed in accord with the invention;

Figure 3 is a horizontal section taken as indicated by the line 3—3 of Figure 2;

Figure 4 is a transverse vertical section taken as indicated by the broken line 4—4 of Figure 2;

Figure 5 is a fragmentary view of a portion of the mechanism, shown partly in side elevation and partly in section, the section being taken as indicated by the line 5—5 of Figure 4;

Figure 6 is a face view of a gear used in the mechanism, showing ratchet teeth thereon; and Figure 7 is a fragmentary sectional view showing a modification of the invention.

Figure 2:
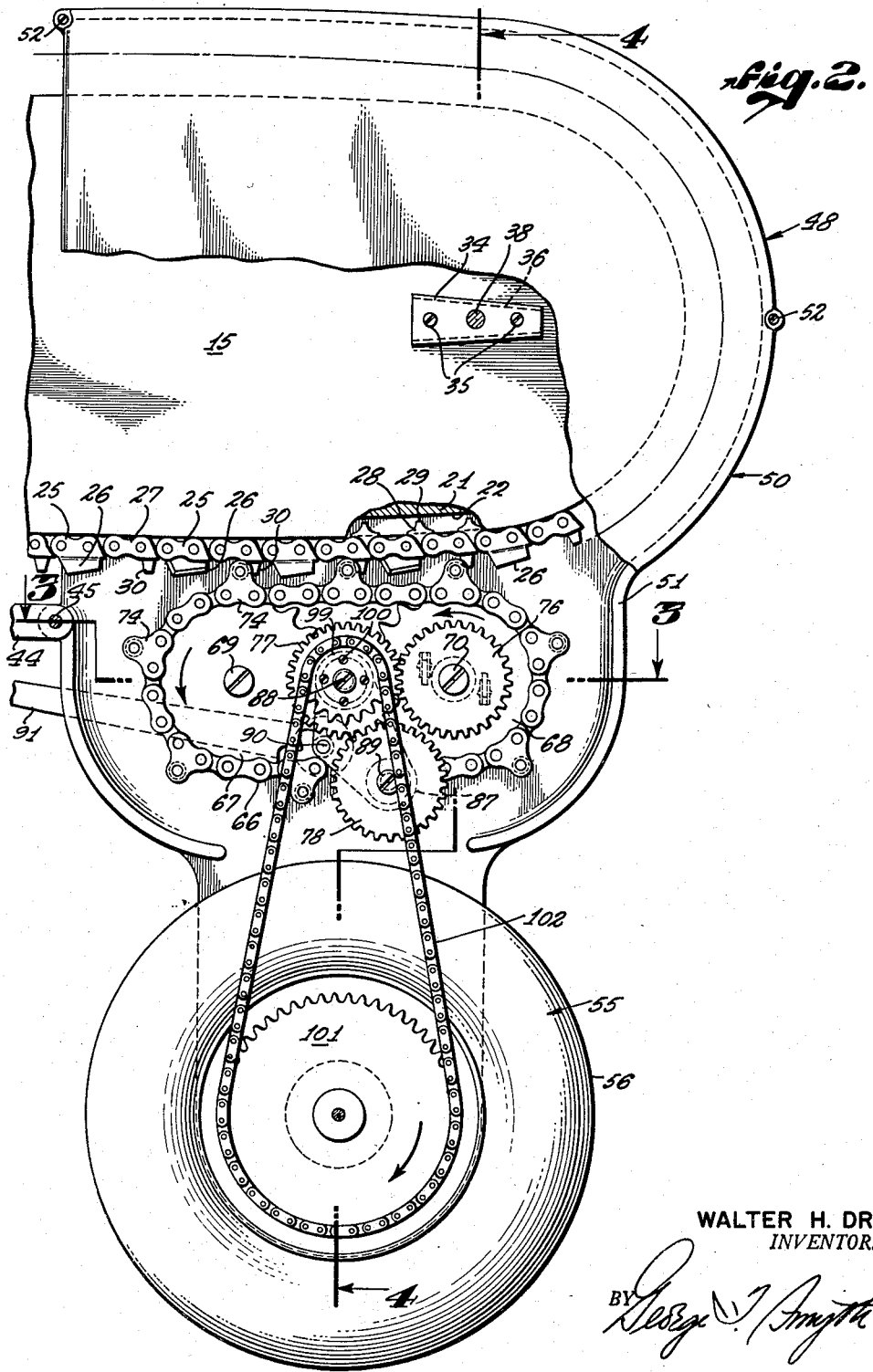
Figure 2 is an enlarged fragmentary view, partly in side elevation and partly in section, showing the mechanism of the accessory unit.

The drawings exemplify the invention as applied to a particular chain saw of a well known type and will afford adequate guidance for those skilled in the art who may have occasion to apply the underlying principles to the construction of an accessory unit for use with other chain saw constructions.

The chain saw illustrated in Figure 1 includes a tubular frame, generally designated 10, on which is mounted the usual power plant in the form of an internal combustion engine 11. The frame 10 has various handle portions for manipulation of the chain saw in its normal use for sawing operations and is equipped with a convenient throttle (not shown) for manual control of the engine. Mounted on the engine 11 is a forwardly extending gear housing 12 and fixedly extending forward from the gear housing is the usual blade 15. The cutting chain, generally designated 16, is driven by a suitable sprocket (not shown) on a shaft 17 inside the gear housing, and travels around the periphery of the blade 15 in a well known manner.

In the particular saw construction depicted by the drawings, the blade 15 is made in three layers comprising two outer plates 20, and an intermediate plate 21, the intermediate plate being smaller in length and width than the two outer plates, thereby forming a peripheral guide channel 22 (Figures 2 and 4) for the cutting chain 16. As best shown in Figure 2, the cutting chain 16 has alternate links 25 carrying outwardly directed cutting teeth 26, which links are spaced apart by intermediate links 27. Each of the links 25 comprises two plates, one of which is integral with its cutting tooth 26 and each of the intermediate links 27 also comprises two plates side by side. The alternate cutting links 25 and the intermediate links 27 are interconnected by central single-plate links 28. Each of the single-plate links 28 is formed with an inwardly extending guide tongue 29 for sliding engagement with the previously mentioned guide channel 22 and the alternate single-plate links are also formed with outwardly extending tongues 30 which serve as depth gauge teeth. Thus outwardly extending depth gauge teeth 30 alternate with outwardly extending cutting teeth 26.

The conventional chain saw illustrated by the drawings is provided with a detachable outboard handle assembly (not shown) which may be mounted on the outer end portion of the blade 15 in a well known manner. For the purpose of removably mounting such a handle assembly, the blade 15 is provided with a pair of tapered bracket plates 34, there being one bracket plate on each side of the blade with the two bracket plates secured to the blade by suitable screws 35.

As shown in Figure 4, one of the bracket plates 34 has a sleeve portion 36 extending through the blade 15 into contact with the other bracket plate, and the two bracket plates together form a bore 37 to receive a suitable bolt 38. Mounted on the threaded end of the bolt is a washer 39 and a nut 40 in the form of a manually rotatable knob. When it is desirable to add the outboard handle, the outboard handle assembly, which is of hollow construction, is slipped over the outer end of the blade 15 into wedging engagement with the tapered bracket plates 34 and then the bolt 38 is extended through both the handle assembly and the blade 15 for anchorage by the knob 40.

When the outboard handle assembly is added, it is customary to provide a suitable guard bar 44 adjacent the cutting chain 16 on the rear edge of the blade 15. The guard bar 44 may, for example, be held in place at one end by a suitable screw 45 (Figure 2) which screw is normally mounted in the outboard handle assembly (not shown), the other end of the guard bar extending into a suitable socket (not shown) in the gear housing 12.

The parts described to this point are structures of the conventional chain saw and are not part of the present invention. A feature of the invention, however, in this preferred embodiment is that the accessory unit, generally designated 48 in Figure 1, is adapted to be mounted on the blade 15 interchangeably with the usual outboard handle assembly and is adapted to be held in place by the bolt 38 and the manually operable nut 40 in the same manner as the outboard handle assembly. A further feature in this regard is that the accessory unit 48 is adapted to receive the screw 45 for attachment of the forward end of the guard bar 44, as shown in Figure 2.

Preferably the accessory unit 48 comprises a support for the outer end of the chain saw in the form of a housing 50, shaped as shown, to slip over the end of the blade 15 in the same manner as the usual outboard handle assembly. The housing 50 may be made in two sections divided along a parting line 51 shown in Figure 4 and held together by suitable screws 52 shown in Figure 2. The inner walls of the housing 50 are formed with suitable ribs or shoulders 53, forming tapered channels for wedging engagement with the tapered bracket plates 34 and the two housing walls are apertured to receive the bolt 38, as may be seen in Figure 4.

The housing 50 carries a single ground wheel 55 which preferably is equipped with a pneumatic tire 56. As shown in Figure 4, the ground wheel 55 is mounted by suitable anti-friction bearings 57 on a fixed axle 58. In the construction shown, the axle 58 is formed with a head 59 at one end to cooperate with a screw 60 and washer 61 for engagement with one wall of the housing 50. The other end of the axle is provided with a nut 62.

Preferably suitable sprocket means is employed to derive power from the cutting chain 16. In this preferred embodiment of the invention, the sprocket means comprises a sprocket chain 66 on two spaced sprocket wheels 67 and 68 which are mounted inside the housing 50 by means of spindles 69 and 70, respectively. Alternate links 74 of the sprocket chain 66 serve as sprocket members for engagement with the depth gauge teeth 30 of the cutting chain 16. For this purpose, each of the alternate links 74 comprises a pair of parallel plates of triangular configuration, which pair of plates support a sprocket roller 75 for operating engagement with the depth gauge teeth 30.

As heretofore indicated, a feature of the preferred embodiment of the invention is that this power-deriving means comprising the sprocket chain 66 and the two sprocket wheels 67 and 68 is operatively connected with the ground wheel 55 for driving the ground wheel in a reversible and free-wheeling manner. Any suitable arrangement may be employed to carry out this purpose.

In the construction shown, the power transmission includes a first gear 76, a second gear 77, and a third gear 78, which gears cooperate for reversibly driving the ground wheel 55. The first gear 76 is mounted on the same spindle 70 as the sprocket 68 for rotation independently of the sprocket wheel, but is provided on its inner face with ratchet teeth 80 as best shown in Figure 6, for the purpose of actuation by the sprocket wheel. A pair of diametrically positioned pawls 81 pivotally mounted in corresponding brackets 82 on the sprocket wheel 68, are urged by suitable springs 83 (Figure 4) into engagement with the ratchet teeth 80. Counterclockwise rotation of the sprocket wheel 68, as viewed in Figure 2, will rotate the gear 76 counterclockwise but the gear is free to rotate independently counterclockwise relative to the sprocket wheel. Thus, the gear 76 is driven by the sprocket wheel 68 in a free-wheeling manner.

The second and third gears 77 and 78 are mounted on a suitable control member 87 by spindles 88 and 89, respectively, and are in continuous mesh with each other. The control member 87 may be in the form of a plate that is mounted on a control shaft 90 to be rocked between two alternate positions. In the position shown in Figure 2, the control member 87 holds the second gear 77 in mesh with the first gear 76, the third gear 78 being free. In its alternate position (not shown) the control member 87 places the third gear 78 in mesh with the first gear 68 and swings the second gear 77 clear. The control shaft 90 extends to the exterior of the housing 50 and it is controlled by what may be termed a reverse lever 91, the reverse lever being integral with a collar 92 that is mounted on the outer end of the control shaft.

Preferably suitable detent means is provided to releasably retain the reverse lever 91 selectively in its two alternate positions corresponding to the described alternate positions of the control member 87. For this purpose the outer wall of the housing 50 may be formed with a boss 95 surrounding the control shaft 90, as best shown in Figure 5, and this boss may be formed with two spaced detent recesses 96. For cooperation with the detent recesses 96, the handle collar 92 may be provided with a suitable spring-pressed detent 97 in a well known manner, as indicated in Figure 4.

It is apparent that either the second gear 77 or the third gear 78 may be operatively connected to the ground wheel 55 to accomplish the purpose of the invention. In the construction shown, a suitable sprocket 99 mounted on the second gear 77 by suitable screws 100 drives a second larger sprocket 101 through the medium of a sprocket chain 102. The larger sprocket 101 is unitary with the ground wheel 55, being mounted on a hub extension 103 of the ground wheel.

If desired, other free wheeling means may be employed in various practices of the invention. For example, Figure 7 shows a sprocket wheel 68a and a gear 76a which may be substituted for the previously described sprocket wheel 68 and first gear 76, respectively. The sprocket wheel 68a is mounted on a spindle 105 having an enlarged head 106. Integral with the sprocket wheel 68a is a hub 107 and a sleeve extension 108, which sleeve extension has a pair of diametrically opposite longitudinal slots 110. The first gear 76a is rotatably mounted on the sleeve extension 108 in abutment against the hub 107 and is formed with a circular series of ratchet teeth 111 which serve the same purpose as the previously mentioned ratchet teeth 80. The pawl means for cooperation with the ratchet teeth 111 comprises a disc 112 that is centrally apertured to slide on the sleeve extension 108 and is formed with inwardly extending lugs 113 for sliding engagement with the walls of the two diametrical slots 110. The disc 112 is formed with teeth 114 for engagement with the ratchet teeth 111 and the disc is continuously urged against the gear 76a by a suitable coil spring 115 in compression between the disc and the head 106 of the spindle 105. Rotation of the sprocket 68a in one direction causes corresponding rotation of the gear 76a by virtue of engagement of the pawl teeth 114 with the ratchet teeth 111, but the gear 68a is free to rotate in the other direction relative to the sprocket wheel 68a.

The manner in which the invention operates may be readily understood from the foregoing description. In preparation for transporting the chain saw from one location to another, the accessory unit 48 is mounted on the outer end of the blade 15 to replace the usual outboard handle assembly. If the operator desires to maneuver the resulting mobile saw in front of him in the manner of a wheelbarrow, he will grasp the handle portions of the frame 10 as shown in Fig. 1. With the reverse lever 91 in position for forward actuation of the ground wheel 55, he may start the engine 11 to actuate the cutting chain 16 thereby to actuate the ground wheel 55. If he desires to move the mobile saw in this manner without starting the engine 11, he may do so freely because the described free wheeling arrangement makes it possible for the ground wheel 55 to rotate independently of actuation of the cutting chain 16.

If the operator prefers to reverse his position from the operator's position shown in Figure 1, and have the mobile saw propelled behind him, he will move the reverse lever 91 to its alternate position. By virtue of the described gear arrangement, the ground wheel 55 will move in a free wheeling manner in this reverse direction as well as in the forward direction.

When the operator reaches the desired new location, it is a simple matter to remove the manually operable nut 40 to detach the accessory unit 48 and to use the saw in the normal manner separate from the accessory unit. For operation by two men the usual outboard handle assembly replaces the accessory unit 48.

My description in specific detail of the preferred practice of the invention will suggest to those skilled in the art various changes, substitutions and other departures from my disclosure that properly lie within the spirit and scope of the appended claims.

I claim:

1. Means for combination with a manually portable power-actuated chain saw for self-propelling transportation thereof, comprising: at least one ground wheel; means to support the chain saw on the ground wheel; means for engagement with the cutting chain of the saw to derive power therefrom; and means to operatively connect said power deriving means with said ground wheel for power rotation thereof.

2. Means for combination with a manually portable power-actuated chain saw for self-propelling transportation thereof, comprising: at least one ground wheel; means to support the chain saw on the ground wheel; means for engagement with the cutting chain of the saw to derive power therefrom; and a free-wheeling power transmission operatively connecting said power-deriving means with said ground wheel to actuate the ground wheel and to permit rotation of the ground wheel independently of the cutting chain.

3. Means for combination with a manually portable power-actuated chain saw for self-propelling transportation thereof, comprising: at least one ground wheel; means to support the chain saw on the ground wheel; means for engagement with the cutting chain of the saw to derive power therefrom; transmission means to transmit power from said power-deriving means to said ground wheel; free-wheeling means included in said transmission means to permit the ground wheel to rotate independently of the power deriving means; and adjustable gearing included in said transmission means to permit reversal of the direction of power rotation of said ground wheel.

4. The combination as set forth in claim 3 in which said adjustable gearing operatively connects said free-wheeling means with said ground wheel thereby to permit free wheeling of the ground wheel in either rotary direction in accord with the adjustment of the gearing.

5. Means for combination with a manually portable power-actuated chain saw for self-propelling transportation thereof, comprising: at least one ground wheel; means to support the chain saw on the ground wheel; sprocket means for sprocket engagement with the cutting chain of the saw; and means operatively connecting said sprocket means with said ground wheel.

6. The combination as set forth in claim 5 in which said sprocket means comprises a sprocket chain.

7. A combination as set forth in claim 6 in which said sprocket chain is mounted on a pair of sprocket wheels.

8. A combination as set forth in claim 7 in which one of said sprocket wheels is operatively connected with said ground wheel.

9. A combination as set forth in claim 8 in which one of said sprocket wheels is operatively connected with said ground wheel by free-wheeling means to permit rotation of the ground wheel independently of said sprocket means.

10. A combination as set forth in claim 9 in which said free-wheeling means is operatively connected with said ground wheel by reversible gearing.

11. A combination as set forth in claim 1 in which said connecting means includes: a first gear operated by said power-deriving means; a control means; a second gear carried by said control means and operatively connected with said ground wheel; and a third gear carried by said control means and meshed with said second gear, said control means being manually movable between two alternate positions to mesh said second and third gears alternately with said first gear to actuate said ground wheel in alternate directions.

12. A combination as set forth in claim 11 in which said power-deriving means is operatively connected with said first gear by free-wheeling means.

13. An accessory to make a manually portable power-actuated chain saw including a power means, a saw chain guide blade and a saw chain self propelling for transportation from one location to another, comprising: support structure adapted for attachment to the guide blade of the saw; a ground wheel on said support structure to support the saw; a pair of sprocket wheels carried by said support structure; a sprocket chain carried by said sprocket wheels for engagement with the saw chain thereby to actuate said sprocket wheels; a first gear coaxial with one of said sprocket wheels and operatively connected thereto; a control member; a pair of meshed gears journaled on said control member; chain and sprocket means operatively connecting one of said pair of gears with said ground wheel; means pivotally mounting said control member on said support structure for rotation between alternate positions to mesh said pair of gears alternately with said first gear; and manually operable means to move said control member between its two positions.

14. A combination as set forth in claim 13 in which said one sprocket wheel is connected with said first gear by free-wheeling means to permit rotation of said ground wheel independently of the cutting chain of the saw.

15. The combination with a manually portable power-actuated chain saw having a detachable outboard handle, of an accessory unit for self-propelling transportation of the saw, said accessory unit being adapted for attachment to said power-actuated saw interchangeably with said outboard handle and having in combination: at least one ground wheel; means to support the chain saw on the ground wheel; means for engagement with the cutting chain of the saw to derive power therefrom; and means operatively connecting said power-deriving means with said ground wheel for power rotation thereof.

WALTER H. DRAIN.

References Cited in the file of this patent

UNITED STATES PATENTS

| Number | Name | Date |
|---|---|---|
| 1,578,769 | Sergeant | Mar. 30, 1926 |
| 2,038,626 | Arsneau | Apr. 28, 1936 |
| 2,164,845 | Steed et al. | July 4, 1939 |
| 2,348,588 | Arsneau | May 9, 1944 |
| 2,360,316 | Carlson | Oct. 17, 1944 |
| 2,374,533 | Fulton | Apr. 24, 1945 |
| 2,578,097 | Soss | Dec. 11, 1951 |
| 2,597,017 | McKinstry | May 20, 1952 |

FOREIGN PATENTS

| Number | Country | Date |
|---|---|---|
| 118,817 | Australia | Aug. 14, 1944 |